Feb. 7, 1950 — R. O. WATKINS — 2,496,507
FRAME FOR DYNAMOELECTRIC MACHINES
Filed Nov. 29, 1946 — 2 Sheets-Sheet 1

Inventor
RAYMOND O. WATKINS
by The Firm of Chandler & Kibbe
Attys.

Feb. 7, 1950 R. O. WATKINS 2,496,507
FRAME FOR DYNAMOELECTRIC MACHINES
Filed Nov. 29, 1946 2 Sheets-Sheet 2

Inventor
RAYMOND O. WATKINS

Patented Feb. 7, 1950

2,496,507

UNITED STATES PATENT OFFICE 2,496,507

FRAME FOR DYNAMOELECTRIC MACHINES

Raymond O. Watkins, Chicago, Ill., assignor to Nader Engineering Company, Chicago, Ill., a corporation of Illinois Application November 29, 1946, Serial No. 712,997

7 Claims. (Cl. 171—252)

This invention relates to dynamoelectric machines, and particularly to an improved frame construction for such machines and a method of fabrication and assembly of such frame structure in co-operation with a laminated magnetic member of the dynamoelectric machine.

A common form of construction of a dynamoelectric machine embodies a stack of magnetic laminations, which generally constitutes the stator element of the machine, and which has a generally cylindrical exterior configuration. It is necessary to secure such laminated magnetic structure within the frame of the machine and to firmly hold the individual laminations of the magnetic structure in fixed relationship with each other. At the same time, the securing devices should not produce any substantial path for eddy currents.

A feature of this invention is the provision of an improved method of fabricating a frame element for a dynamoelectric machine, by stamping and bending operations upon a piece of sheet metal.

A further feature of this invention is the provision of an improved frame construction for dynamoelectric machines wherein a sheet metal frame member of generally annular configuration is provided with means for securely retaining a stack of magnetic laminations within its periphery and such means operate to exert a continuous resilient clamping force upon the stack of laminations. Concurrently, a frame construction embodying this invention provides a plurality of axially extending passages spaced about the periphery of the stack of magnetic laminations to permit large volume cooling air-flow around the periphery of such magnetic structure.

Accordingly, it is an object of this invention to provide an improved method for fabricating a stationary member of a dynamoelectric machine by stamping and bending operations on sheet metal.

Another object of this invention is to provide an improved sheet metal frame construction for a dynamoelectric machine characterized by the provision of a plurality of axial flow cooling passages for air flow between the frame member and a magnetic structure mounted within the frame member.

A particular object of this invention is to provide an improved metal frame construction for a dynamoelectric machine which will not only securely retain a stack of magnetic laminations within such frame member but will exert a resilient compressive clamping action on the stack of laminations, and retain such laminations in rigid assembly without requiring rivets or similar elements passing through the magnetic laminations.

The specific nature of this invention as well as other objects and advantages thereof will become apparent to those skilled in the art from the following detailed description of the annexed sheets of drawings which, by the way of preferred example only, illustrate one specific embodiment of the invention.

Figure 1:
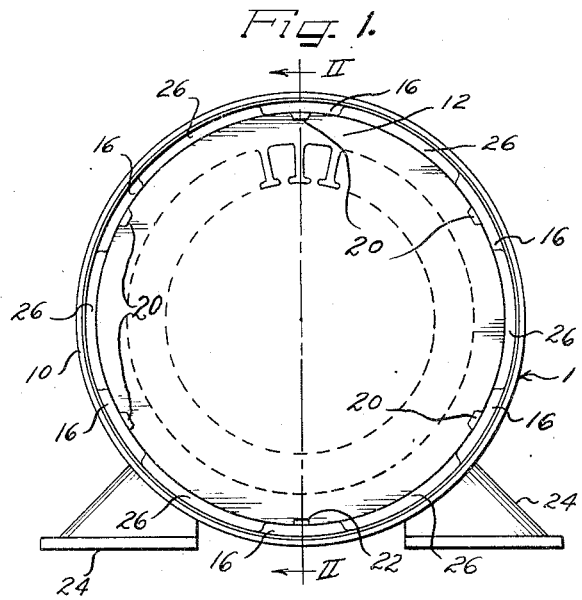
Figure 1 is an elevational view of an assembled magnetic structure and frame for a dynamoelectric machine embodying this invention.

A dynamoelectric machine embodying this invention is indicated by the numeral 1. In its assembled condition, the dynamoelectric machine 1 comprises a frame element 10 of generally annular configuration which surrounds and supports a magnetic structure 12, which usually constitutes a stack of individual magnetic laminations. While not limited thereto, the stack 12 generally constitutes the stator element of the dynamoelectric machine.

The magnetic structure 12 is supported in inwardly spaced relationship with respect to the general periphery of frame 10 by a plurality of indentations 16 which are integrally formed in the frame 10 at spaced intervals around its periphery. Indentations 16 preferably have base surfaces 18 of substantial area and such base surfaces 18 snugly engage the generally cylindrical periphery of the magnetic structure 12 and position such concentrically within the frame 10.

To prevent any axial displacement of the magnetic structure 12 relative to the frame 10, as well as to clamp the individual laminations forming the magnetic structure 12 tightly together, a pair of integral, inwardly projecting tongues 20 are provided in the base surfaces 18 of a plurality of the indentations 16. The tongues 20 are axially spaced a distance corresponding to the thickness of the magnetic stack 12 and preferably the inner edges of the tongues 20 are spaced slightly less than the thickness of the stack 12 so that the tongues 20 are resiliently stressed outwardly by the insertion of the stack 12 therebetween, and hence exert a resilient clamping action on the magnetic structure 12.

Figure 2:
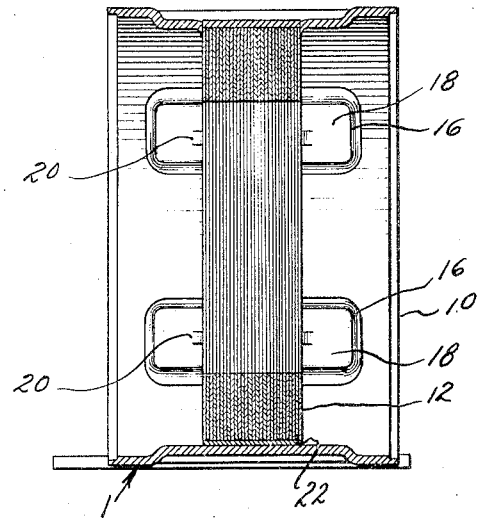
Figure 2 is a vertical sectional view taken along the plane II—II of Figure 1.

To prevent any rotational shifting of the individual laminations of the magnetic structure 12 with respect to each other, a key 22 (Figures 1 and 2) is preferably provided which engages in axially aligned key slots 28 provided in each of the laminations.

The frame 10 may be mounted on any desired base structure, such for example as on a pair of leg members 24 which are welded or otherwise rigidly secured to the external surface of the frame 10.

With the afore-described construction, the magnetic structure 12 will be securely retained within the frame 10 in a fixed position, and furthermore, the individual laminations 14 will be fixed against relative movements. It will be particularly noted that no rivets or other conducting retaining members passing through the laminations are utilized to clamp the laminations 14 together, and hence the eddy current losses in the described construction will be minimized. Also, the magnetic structure 12 may have a concentric periphery, contributing to attainment of uniform flux distribution therein. Furthermore, the supporting of the magnetic structure 12 in inwardly spaced relationship with respect to the frame 10 provides a plurality of axial flow air passages 26 which are respectively defined between each pair of adjacent indentations 16. Hence, a large volume of cooled air flow around the periphery of the magnetic structure 12 may be accommodated and the magnetic structure 12 efficiently cooled by the intimate contact of the cooling air flow therewith. Also, the large area of contact between frame 10 and magnetic structure 12 represented by concave surfaces 18 assures substantial heat transfer by conduction.

Figure 3:
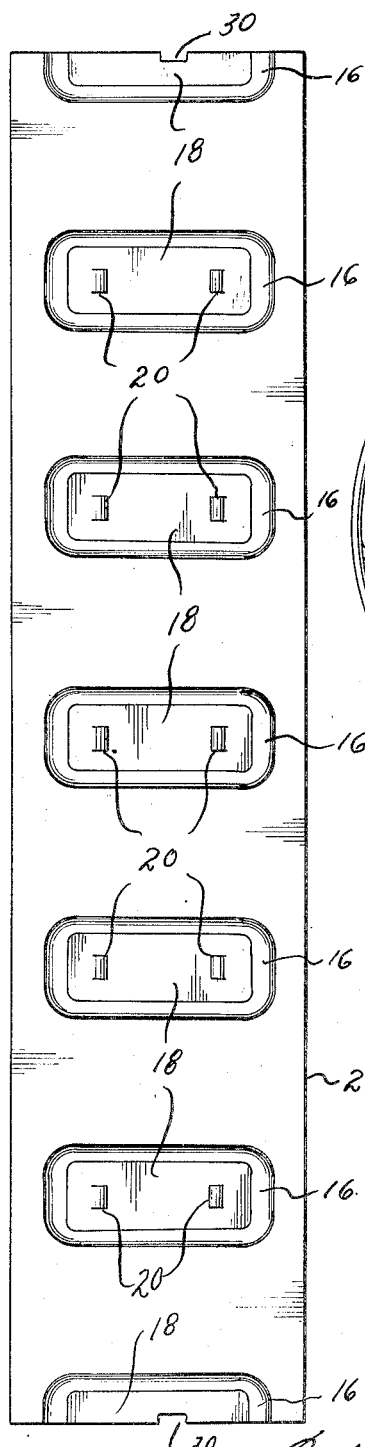
Figure 3 is an elevational view of the sheet metal frame member showing its appearance prior to being bent into annular form.

The afore-described frame construction may be economically produced by stamping and bending operations on sheet metal in accordance with the method of this invention. Referring to Figure 3, a strip 2 of sheet metal is formed having exterior dimensions corresponding to the developed dimensions of the finished frame 10. The indentations 16 may be conveniently stamped into the strip 2 while it is in its sheet form, and likewise, the tongues 20 may be struck up in the base portion 18 of the indentations 16 during the same stamping operation or by a second stamping operation. The base surfaces 18 of indentations 16 are preferably given a concave configuration in this stamping operation.

Preferably, one of the indentations 16 is not provided with the tongues 20 but in place thereof is provided with a central aperture 30. As will be seen, the aperture 30 facilitates the welding of the key 22 during assembly of the frame structure on the magnetic stack 12.

Figure 4:
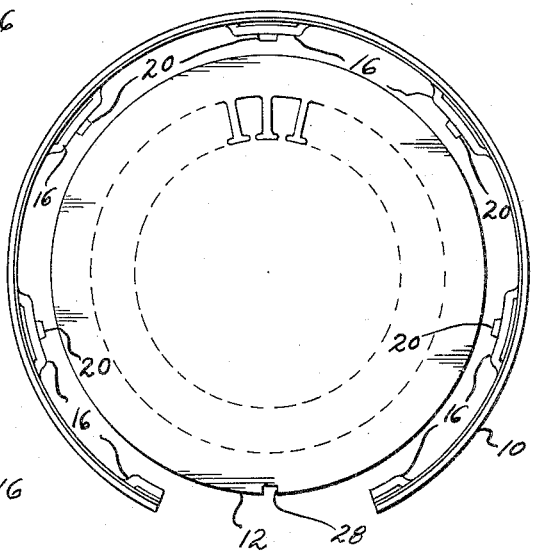
Figure 4 is an elevational view showing the relationship of the frame member with respect to the magnetic structure at an intermediate stage in the process of assembling such components.

The strip 2 with the indentations 16 and the tongues 20 formed therein is then wrapped around a compressed stack of laminations, in the manner shown in Figure 4. In this wrapping or bending operation, the tongues 20 are engaged on opposite sides of the laminated stack 12 and preferably stressed outwardly to exert a clamping action on the stack. Since the base surfaces 18 of indentations 16 are concavely formed to correspond to the curvature of the periphery of the magnetic stack 12, such surfaces will snugly engage the peripheral surface of the magnetic stack 12 and provide adequate support therefor without requiring any additional machining operations to be performed on such surfaces.

The strip 2 is wound tightly around the periphery of the magnetic stack 12 to bring the free ends thereof in juxtaposition and hence forming the strip 2 into an annular frame configuration. The free ends of strip 2 are secured against relative movements in any suitable manner, preferably by a transverse weld. Prior to the wrapping operation, the key 22 is inserted into the key slot 28 in the magnetic laminations 14 and the key is now welded to the adjacent portions of the frame 10. The hole 30 provided in one of the indentations 16 is positioned opposite the key 28 and facilitates the welding operation.

It is therefore apparent that the described method permits a frame structure to be fabricated and assembled to a magnetic structure in a very convenient manner, utilizing only stamping and bending operations which are extremely economical to perform and well suited for large quantity production.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. The method of forming an assembly of a laminated magnetic structure in an annular frame of a dynamoelectic machine which comprises forming a cylindrical stack of laminations having a circular periphery, forming a metal sheet equivalent to the developed dimensions of the frame desired, forming in said sheet two rows of resilient projections extending along the length of the sheet which corresponds with the circumference of the frame and spaced laterally apart a distance corresponding to the thickness of said stator stack, bending said sheet around the periphery of said stator stack to snugly position said stator stack in clamped relation between said two rows of projections and to bring the ends of said sheet into juxtaposition, and securing the juxtaposed ends of the sheet against relative movement.

2. The method of forming an assembly of a laminated stator in an annular frame of a dynamoelectric machine which comprises forming a generally cylindrical stack of stator laminations, forming a metal sheet equivalent to the developed dimensions of the frame desired, forming in said sheet a plurality of indentations spaced along the length axis of the sheet corresponding with the circumference of the frame and extending laterally of the sheet to a greater width than the thickness of the stator stack, forming a pair of laterally spaced resilient projections in identical locations in each of said indentations and spaced laterally apart a distance corresponding to the thickness of said stator stack, wrapping said sheet around the periphery of said stator stack to snugly position said stator in clamped relation between said two rows of projections and supported on said indentations in inwardly spaced relationship with respect to those portions of the metal sheet lying between said indentations, and securing the juxtaposed ends of the wrapped sheet against relative movements.

3. The method of forming an assembly of a laminated stator in an annular frame of a dynamoelectric machine which comprises forming a generally cylindrical stack of stator laminations, forming a metal sheet equivalent to the developed dimensions of the frame desired, forming in said sheet two rows of resilient, inwardly directed tongue-like projections extending along the length of the sheet corresponding to the circumference of the frame and spaced laterally apart a distance less than the thickness of said stator stack, bending said sheet around the periphery of said stator stack to snugly position said stator stack in clamped relation between said two rows of projections and to bring the ends of said sheet into juxtaposition, said tongues being resiliently stressed by said stator stack to exert a clamping force thereon, and securing the juxtaposed ends of the sheet against relative movements.

4. A method of forming an assembly of a laminated magnetic structure in an annular frame of a dynamoelectric machine which comprises forming a generally cylindrical stack of magnetic laminations, forming a metal sheet equivalent to the developed dimensions of the frame desired, forming in said metal sheet a plurality of indentations spaced along the length axis of the sheet corresponding with the circumference of the frame and extending laterally of the sheet to a greater width than the thickness of the stator stack, forming a pair of integral, tongue-like resilient projections in identical locations in each of said indentations and laterally spaced apart a distance corresponding to the thickness of said stack of laminations, bending said sheet around the periphery of said stack of laminations to snugly position said stack between each of said pairs of projections and to support said stack on said indentations in inwardly spaced relationship with respect to the portions of the metal sheet lying intermediate said indentations, said tongues being resiliently stressed by assembly of said stator stack therebetween to exert the clamping force thereon, securing the ends of the sheet together and securing the laminated stack against relative rotational movement with respect to the metal sheet.

5. A stationary member for a dynamoelectric machine comprising a magnetic structure having a cylindrical periphery and a sheet metal frame member surrounding said magnetic structure, said frame member having a plurality of integral, inwardly directed indentations spaced around the periphery thereof and having a substantial base area conforming to and engaging the periphery of said magnetic member, thereby defining a plurality of axially extending passages between said frame and the magnetic member for cooling air flow, and integral, inwardly directed resilient projections on said frame member snugly engaging both end faces of said magnetic structure at spaced points around the periphery thereof to lock the magnetic member in said frame member.

6. In a dynamoelectric machine, a stack of magnetic laminations, a sheet metal frame member wrapped around the periphery of said stack, said frame member having a pair of spaced rows of integral, inwardly directed, resilient tongue-like projections respectively disposed on opposite sides of said magnetic stack, said projections being resiliently stressed outwardly in assembly of said frame on said magnetic stack to exert a clamping force on said laminations.

7. A stationary member for a dynamoelectric machine comprising a magnetic structure having a cylindrical periphery, a sheet metal frame member surrounding said magnetic structure, said frame member having a plurality of integral, inwardly directed indentations spaced around the periphery thereof and having a substantial base area of concave configuration engaging the periphery of said magnetic member to support said magnetic member in inwardly spaced relationship with respect to those portions of the frame member lying intermediate said indentations, thereby defining a plurality of axially extending passages between said frame and magnetic member for cooling air flow, a plurality of said indentations extending axially beyond the width of said magnetic member on both sides thereof, and a plurality of inwardly directed, resilient tongues integrally formed in said extending portions of said indentations, said tongues being constructed and arranged to resiliently engage both end faces of said magnetic member to exert clamping action thereon, thereby locking said magnetic member in said frame.

RAYMOND O. WATKINS.

REFERENCES CITED

The following references are of record in the file of this patent:

UNITED STATES PATENTS

| Number | Name | Date |
|---|---|---|
| 1,816,859 | Linders | Aug. 4, 1931 |
| 1,820,531 | Englehardt | Aug. 25, 1931 |
| 2,151,561 | Morrill | Mar. 21, 1939 |